United States Patent [19]

Metz

[11] 4,083,406
[45] Apr. 11, 1978

[54] METHOD AND APPARATUS FOR SEALING DRILL CASING

[76] Inventor: Thomas L. Metz, 10 Michael, Park Forest, Ill. 60466

[21] Appl. No.: 742,870

[22] Filed: Nov. 18, 1976

[51] Int. Cl.² ............ E21B 33/13; E21B 43/27
[52] U.S. Cl. ............................ 166/286; 166/300; 166/162; 166/177
[58] Field of Search ............ 166/286, 295, 162, 300, 166/177

[56] References Cited

U.S. PATENT DOCUMENTS

| 1,801,983 | 4/1931 | Saye | 166/286 |
|---|---|---|---|
| 3,014,530 | 12/1961 | Harvey et al. | 166/295 |
| 3,557,562 | 1/1971 | McLaughlin et al. | 166/295 |
| 3,637,019 | 1/1972 | Lee | 166/295 |
| 3,726,340 | 4/1973 | Frazer | 166/295 |
| 3,901,319 | 8/1975 | Staley et al. | 166/286 |

*Primary Examiner*—James A. Leppink
*Attorney, Agent, or Firm*—Fitch, Even, Tabin & Luedeka

[57] ABSTRACT

A method and apparatus is disclosed for permanently sealing the lower end of a drill casing to a liquid impermeable layer such as bedrock to prevent contaminating fluid seepage between the casing and the liquid impermeable layer from strata disposed above the impermeable layer. Selected quantities of aggregate, resin monomer and catalyst are introduced into the lower end of the well casing and are caused to mix and polymerize whereafter the resinous mixture is ejected through one or more openings in the casing wall adjacent the bedrock layer to form a plug seal which is chemically and mechanically secured to the well casing and the bedrock layer.

9 Claims, 4 Drawing Figures

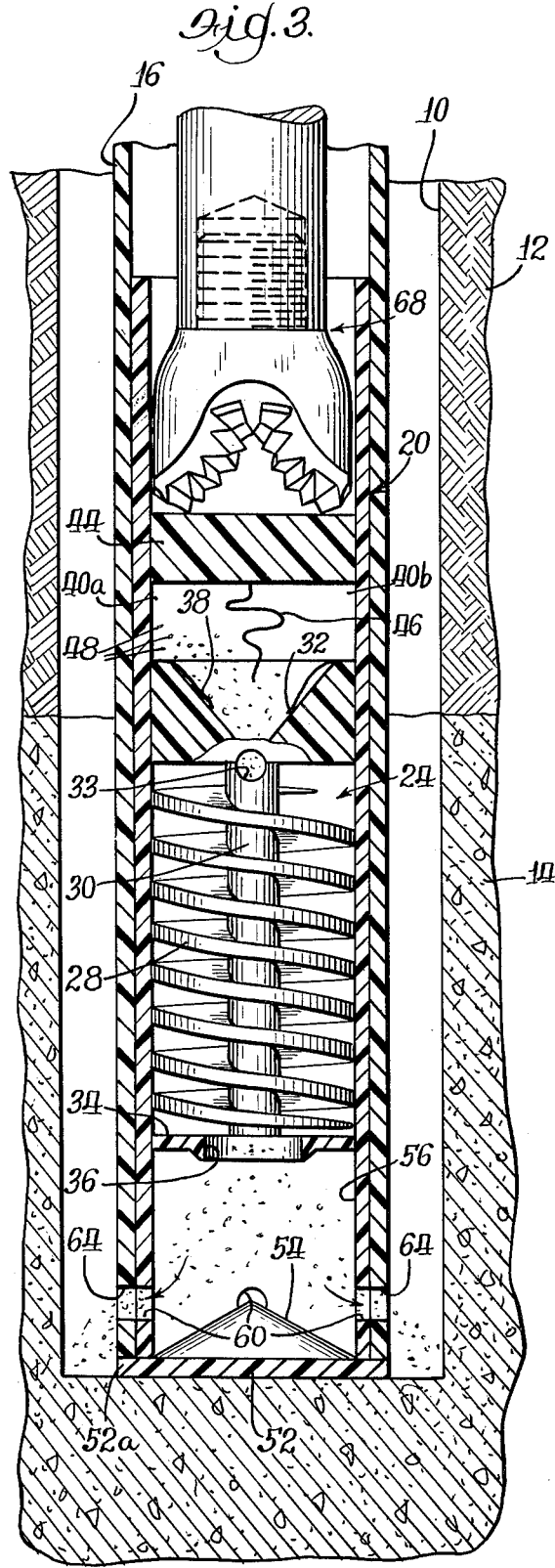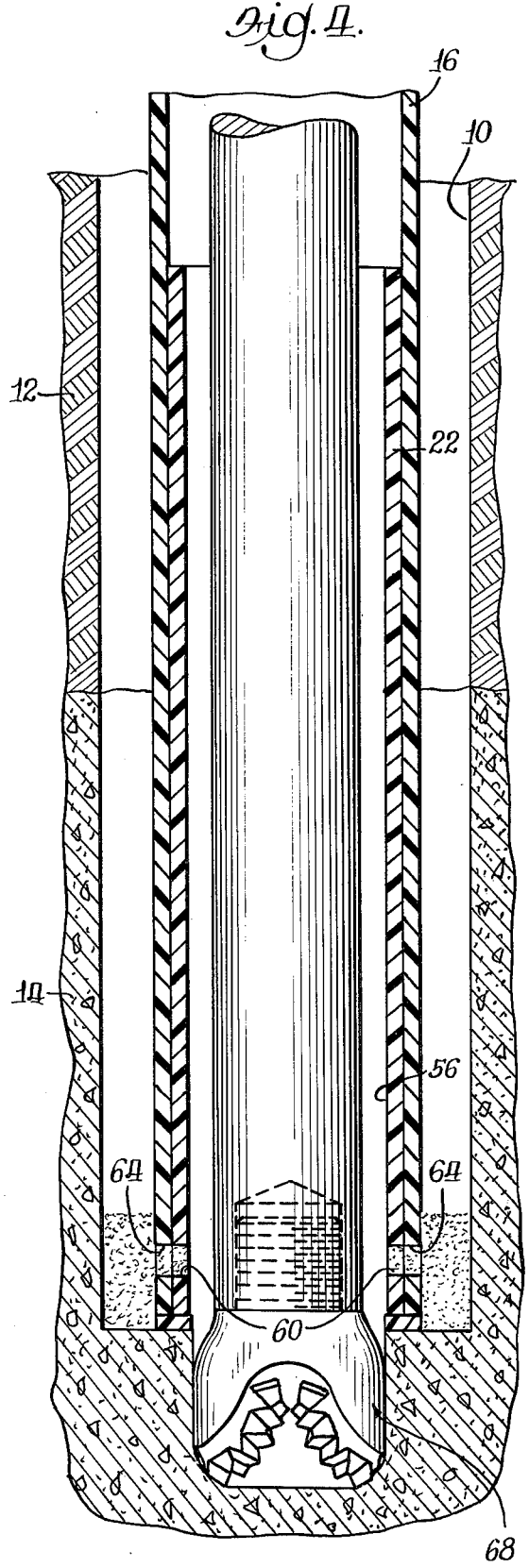

METHOD AND APPARATUS FOR SEALING DRILL CASING

The present invention relates generally to the sealing of well casings in bore holes to prevent undesirable leakage or seepage into the well hole, and more particularly to a novel method and apparatus for sealing a well casing to a liquid impermeable layer such as bedrock so as to prevent seepage of contaminating fluids either into the well casing or between the well casing and the impermeable layer from strata disposed above the bedrock.

In drilling well holes, porous formations in strata are frequently encountered during drilling which contain pockets or deposits of fluids of undesirable purity. It is a common practice in drilling water wells to drill downwardly below the surface a distance sufficient to avoid polluted water or other undesirable liquids and obtain relatively pure water which may lie within or below a lower liquid impermeable layer such as bedrock. Heretofore, it has been a conventional practice in drilling well holes to drill downwardly through the upper strata by means of a drill followed by insertion of a tubular metallic well casing. The hole is drilled downwardly until a subterranean liquid impermeable layer is reached whereafter the well casing is inserted and sealed at its lower end to prevent downward seepage past the well casing. The drilled hole may approach two hundred feet in depth before the bedrock layer is reached so that the well casing must also be approximately two hundred feet in length. In one method of sealing the well casing to prevent undesirable seepage a drive shoe is affixed to the lowermost end of the well casing, which may comprise axially connected fifteen foot sections, and is driven physically into the bedrock layer. The mechanical connection of the drive shoe to the bedrock forms a seal between the lower end of the well casing and the impermeable layer. A hole is then drilled downwardly through the drive shoe and into the bedrock to the depth of the water deposit. The well casing serves as a conduit through which the relatively pure water is drawn upwardly to the surface while preventing contamination by fluids within the upper porous strata.

A major drawback in the use of steel well casing sections and associated steel drive shoes which serve as sealing plugs is that they are susceptible to rust deterioration and, after a period of time, for example approximately 20 years, may fail in their sealing capabilities with the result that they no longer provide the desired contamination protection.

Another known manner of sealing well casings to liquid impermeable bedrock which eliminates the problem of rust deterioration of metallic drive shoes is to drill a hole down to the bedrock layer, insert into the hole a tubular metallic or plastic type well casing having peripheral wall openings adjacent its lower end, introduce a quantity of cement grout downwardly through the well casing and cause the cement grout to pass outwardly through openings in the lower end of the tubular casing whereafter the cement solidifies or "sets" to form a seal between the casing and the bedrock. After solidification, the plugged lower end is drilled through to complete the well hole to the desired depth.

A disadvantage in the use of cement grout to form a plug seal between the well casing and the bedrock layer is the fact that the cement must be allowed to "set" after pouring which normally takes approximately 24 hours. In the use of both steel pipe, which may be upwards of 15 inches in diameter, and plastic pipe, which may be upwards of approximately 4 to 6.5 inches in diameter, the volume of cement grout required, and thus the "set" time, is substantial. The volume of cement grout needed is still further increased by the requirements of many public health departments which prefer that the sealing grout extend exteriorly of the well casing substantially the full length thereof above the bedrock layer.

Although water wells may be drilled with rather simple drilling rigs as opposed to the complex and highly expensive drill rigs used in oil drilling, it is desirable that the well be completed as quickly as possible to minimize costs. In drilling water wells wherein cement grout is used to seal the well casing, the increased time necessary to allow the cement plug seals to "set" substantially increases the cost of drilling the wells by increasing the downtime of the drilling rig. The special equipment and hoses needed to prepare and insert the cement grout into the well casing further adds to the cost. Additionally, the lower temperatures and damp conditions at the bottom end of the well casing require a special cement grout formulation, thereby adding still further to the cost of well drilling. In practice, a "wet" cement is used which facilitates entry down into the well casing and flow upwardly about the outer surface of the well casing.

One of the primary objects of the present invention is to provide a novel method and apparatus for sealing the lower end of a well casing which eliminates the drawbacks and disadvantages in the prior art methods and apparatus.

A more particular object of the present invention is to provide a novel method and apparatus for forming a seal between a well casing and a subterranean liquid impermeable layer such as bedrock wherein the seal takes the form of a plastic sealing plug which is chemically and mechanically adhered to the well casing and adjacent impermeable layer so as to prevent seepage of contaminating liquids into the well casing or downwardly between the well casing and the liquid impermeable layer.

In carrying out the present invention, a plastic tubular well casing is inserted downwardly into a pre-drilled bore hole which extends downwardly to and partially into a liquid impermeable layer such as bedrock, the initially drilled hole ending above a water deposit to which the well hole will eventually be drilled. The well casing has one or more openings in its peripheral wall at the lower end portion received within the drilled hole within the impermeable layer. In one embodiment, a plastic storage cartridge is disposed within the lower end of the well casing and retains predetermined quantities of an aggregate, a resin monomer and a catalyst in separated relation. The plastic storage cartridge includes a mixing element and a spreader and is responsive to a force applied from the open end of the well casing to release the aggregate, resin monomer and catalyst which then are forced through the mixing element whereupon the mixture is discharged through the peripheral wall openings to form a solid plastic plug seal between the outer peripheral surface of the well casing and the adjacent liquid impermeable layer. The plug seal is also formed within the lower end of the well casing and is chemically and mechanically attached to the well casing and bedrock layer. After the lower end of the plastic well casing is thus sealed to the bedrock, a drill is inserted downwardly through the well casing to drill through the plastic storage cartridge and internal portion of the plug seal and through the impermeable layer to the water deposit. A well casing seal as thus formed provides the desired sealing in an economical manner and is not adversely affected by the moisture and lower temperature conditions which exist at the point of sealing.

Further objects and advantages of the present invention, together with the organization and manner of operation thereof, will become apparent from the following detailed description of the invention when taken in conjunction with the accompanying drawings wherein like reference numerals designate like elements throughout the several views, and wherein.

FIG. 3 is a cross sectional view similar to FIG. 1 but showing the initial stages of mixing and ejection of the seal material from the cartridge disposed within the lower end of the well casing; and FIG. 4 is a cross sectional view similar to FIGS. 1 and 3 but showing the completed seal peripherally of the lower end of the well casing and a portion of a drill completing the well hole downwardly through and below the well casing.

Figure 1:
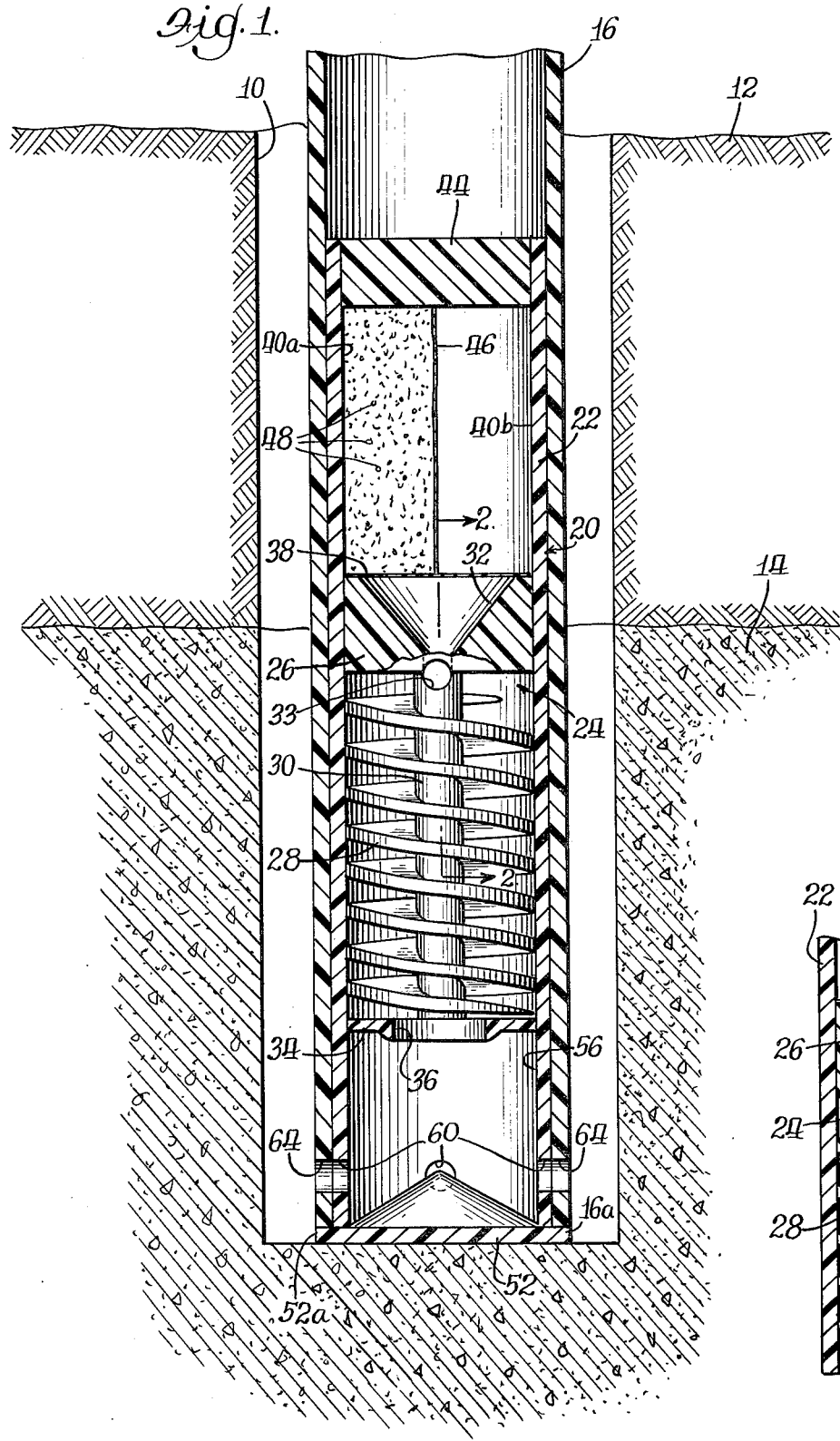
FIG. 1 is a cross sectional view of a well casing disposed within a bore hole preparatory to forming a seal between the lower peripheral surface of the well casing and the surrounding strata in accordance with the present invention.

Referring now to the drawing, and in particular to FIG. 1, a bore hole is illustrated at 10 as being drilled downwardly through various strata of the earth such as sand or gravel-like strata 12 and partially downwardly into a liquid impermeable layer such as bedrock 14. The bore hole 10 is drilled by conventional drilling techniques and may reach upwards of 200 feet in length from the surface level to the liquid impermeable bedrock layer 14 within which or below which a relatively pure water deposit exists to which the well hole will eventually be drilled for extracting the water. The strata above the liquid impermeable layer of bedrock frequently contains fluids of undesirable purity so that it is a practice in drilling water wells, and also in drilling for oil, to drill a bore hole down to a predetermined depth, insert a tubular well casing, and thereafter form a seal between the outer peripheral surface of the well casing and inner surface of the bore hole to prevent seepage of the undesirable fluids into the well hole or downwardly past the peripheral surface of the well casing into the subsequently drilled well hole.

A tubular well casing, a portion of which is indicated at 16, is disposed within the bore hole 10. In the preferred embodiment, the well casing 16 comprises a plastic drill casing such as PVC or ABS plastic pipe. The well casing 16 may comprise a plurality of axially aligned tubular sections each of which is approximately 15 feet in length and which are secured end-to-end by suitable collars or couplings. In the case of plastic pipe, the well casing sections are generally secured together end-to-end by plastic sleeve-like couplings which are sealingly secured to each of the two adjacent well casing ends, while in the case of metallic well casings, the various section lengths are conventionally secured in end-to-end relation by threaded couplings. The illustrated plastic well casing 16 may have a diameter of approximately 4 to 6¼ inches. Steel well casing, on the other hand, may approach 15 inches in diameter when used with high volume well activity such as in major cities. The well casing 16 and associated bore hole 10 are of predetermined diameters so as to form an annular spacing of approximately ½ to 1 inch radial dimension between the well casing and the bore hole.

The well casing 16 is inserted down within the bore hole 10 after the bore hole has been drilled down to and partially into the liquid impermeable bedrock layer 14. The bore hole 10 may be drilled by conventional techniques using water and mud to cool the drill bit and to flush out rock and stone segments created during the drilling. As will be described in detail herein, a seal is formed between the outer peripheral surface of the lower end of the well casing and the adjacent strata such as the liquid impermeable bedrock 14. If desired, the seal may extend upwardly along the outer surface of the well casing so as to also be disposed between the well casing and at least a portion of the strata 12 disposed above the bedrock layer 14. In accordance with the present invention, the sealing composition is composed of an aggregate and a mixture of monomers which are caused to be selectively mixed with a catalyst and ejected through one or more openings in the peripheral wall of the well casing adjacent the lower end thereof so as to form a seal between the well casing and the liquid impermeable bedrock layer to prevent liquids above the seal from permeating the seal or otherwise flowing downwardly about the peripheral surface of the well casing where such liquids could contaminate the water or other substance which is to be subsequently drawn upwardly through the well casing 16.

In accordance with the illustrated embodiment, seal material supply means in the form of cartridge means, indicated generally at 20, are affixed within the lower end of the well casing 16 so as to be inserted downwardly within the lower end of the bore hole 10 as the well casing is inserted within the bore hole. As will be described more fully hereinbelow, the cartridge means 20 is adapted to contain a predetermined quantity of a selected aggregate, a predetermined quantity of a selected resin monomer and a predetermined quantity of a selected catalyst operative when brought into mixing contact with the aggregate and resin monomer to initiate a thermo-catalytic reaction and effect polymerization of the monomer. The cartridge means 20 includes a cylindrical tubular wall 22 which is adapted to be received upwardly within the lower end of the well casing and may have sliding engagement with the inner peripheral surface of the lower end of the well casing. The tube 22 preferably forms a snug fit with the interior surface of the well casing to maintain the tube in fixed axial position as the well casing is moved downwardly within the bore hole 10. The tubular wall 22 of the cartridge means 20 is made of a suitable plastic material and has mixer element means, indicated generally at 24, secured within the tubular wall 22 so as to occupy approximately the middle one-third of the length of the cartridge means 20.

Figure 2:
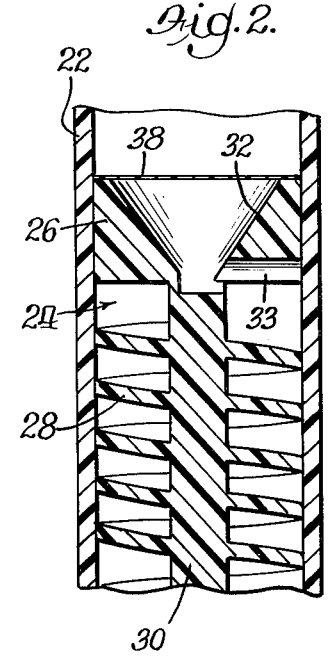
FIG. 2 is a partial longitudinal sectional view taken substantially along the line 2—2 of FIG. 1.

The mixer element means 24 includes a circular disc 26 fixedly secured at its outer peripheral surface to the tubular wall 22. A downwardly directed mixing screw 28 is suitably secured to the lower surface of the disc 26 as by being formed integral therewith. The mixing screw 28 comprises a downwardly inclined helical slide such that a fluent material may be caused to slide downwardly along the mixing screw about an axial shaft portion 30 the upper end of which is suitably secured to the disc 26. The disc 26 includes a centrally disposed conical cavity 32 which terminates at its lower end in a transverse discharge opening 33, as best seen in FIG. 2. In this manner, a fluent substance forced downwardly through the conical cavity 32 will be discharged through the opening 33 and caused to traverse the helical mixing screw 28 within the confines of the tubular wall 22, the fluent substance being caused to undergo a mixing action as it travels downwardly along the mixing screw. A circular discharge aperture plate 34 is secured within the tubular wall 22 adjacent the lower end of the mixing screw and defines a discharge opening 36 through which fluent mixed material will be discharged below the mixing screw 28.

A frangible seal in the form of a thin plastic membrane 38 is secured to the upper surface of the disc 26 and overlies the upper end of the conical cavity 32 so as to selectively prevent downward flow of materials through the cavity 32. Disposed above the frangible seal 38 and thus above the disc 26 is a reservoir chamber 40 which extends to the upper end of the tubular wall 22 and, in the illustrated embodiment, has an axial length equal to approximately one-third the length of the cartridge means 20. The upper end of the reservoir 40 is closed by a plunger disc 44 which is slidingly and sealingly engaged at its circumferential surface to the inner peripheral surface of the tube 22 so as to facilitate axially downward sliding of the plunger disc within the wall 22.

A thin divider wall 46, which may comprise a flexible liquid impermeable thin plastic material such as polyethylene, is disposed within the reservoir 40 and serves to divide the reservoir into substantially two equal and separate areas, the divider wall 46 being substantially rectangular in plan configuration and being secured at its lateral edges to opposite inner surface portions of the tubular wall 22 and at its upper and lower transverse edges to the frangible seal 38 and the lower surface of the upper plunger disc 44, respectively. The divider wall 46 serves to divide the reservoir 40 into two chambers 40a and 40b. In the illustrated embodiment, the chamber 40a is initially filled with a monomer such as a vinyl monomer, examples of which are styrene and divinylbenzene, and also contains an aggregate such as sand or fumed silica or the like, particles of which are indicated at 48, which is intermixed with the monomer. The chamber 40b initially contains an organic catalyst such as benzoyl peroxide or other suitable organic catalyst which is separated from the monomer and associated mixed aggregate 48 by the thin wall 46. The monomer and associated aggregate and catalyst must be capable of reacting while withstanding the lower temperatures and dampness found at the level at which the seal is formed.

The lower end of the tubular wall 22 of the cartridge means 20 is closed by a circular plate 52 which is made of a suitable plastic material and is preferably affixed to the lower end of the tubular wall 22. The circular plate 52 has a diameter greater than the diameter of the tube 22 so as to define an annular flange portion 52a which abuts the lower edge surface 16a of the well casing 16 to limit upward movement of the cartridge means 20 within the well casing.

The end plate 52 preferably has a conical spreader element 54 secured to its upper surface such that the spreader element extends within a chamber 56 disposed between the spreader element and the aperture discharge plate 34. To facilitate discharge of the seal forming material from the cartridge means 20 for forming a seal between the outer peripheral surface of the lower end of the well casing and the adjacent liquid impermeable bedrock layer 14, a plurality of openings 60 are formed in the tubular wall 22 of the cartridge means 20 adjacent its lower end. In the illustrated embodiment, four such openings 60 are formed in equidistant circumferential relation about the lower end of the tubular wall 22 and are alignable with equally circumferentially spaced radial openings 64 in the well casing 16 adjacent the lower end thereof.

It can thus be seen that the cartridge means 20 provides reservoir chambers 40a and 40b for maintaining a monomer and associated mixed aggregate 48 separate from a catalyst disposed within the chamber 40b, both the monomer and aggregate mixture in chamber 40a and the catalyst in chamber 40b being sealingly disposed within the chamber 40 above the mixer element means 24 until such time as the frangible seal 38 is fractured to facilitate intermixing of the monomer, aggregate and catalyst. The cartridge means 20 facilitates carrying of the seal forming substances within the lower end of the well casing 16 such that upon insertion of the well casing within the bore hole 10, the seal material for forming a seal between the lower end of the well casing and the adjacent bedrock strata is located adjacent the location at which the seal will be formed.

In one embodiment of the cartridge means 20, the chamber 40 has an axial length of approximately 1 foot and a volumetric capacity such that the chamber 40a can retain approximately ½ cubic foot of monomer and associated mixed aggregate, while the chamber 40b can accommodate approximately ½ cubic foot of organic catalyst. The mixing element means 24 is similarly made approximately 1 foot in length. The chamber 56 between the lower conical spreader element 54 and the discharge plate 34 is approximately one-half foot in length.

In carrying out the method of the present invention, the well casing 16 is inserted within the bore hole 10 with the cartridge means 20 disposed within the lower end of the well casing as described. The well casing is inserted into the bore hole sufficiently to position the radial openings 64 within the portion of the bore hole drilled into the bedrock layer 14, the drill casing preferably being inserted downwardly until the circular plate 52 secured to the lower end thereof abuts the lower end of the bore hole 10. With reference to FIG. 3, after inserting the well casing 16 and associated cartridge means 20 within the bore hole 10, a plunger element, such as a drill as partially indicated generally at 68 which will effect subsequent drilling of the well hole downwardly within the bedrock to reach the water or other liquid contained therein, is inserted downwardly within the well casing 16. The nonrotating drill 68 is inserted downwardly a distance sufficient to effect engagement of the end of the drill with the upper plunger disc 44. Further downward movement of the nonrotating drill effects downward movement of the plunger disc to cause fracture of the frangible seal 38 and force the monomer and aggregate mixture from the chamber 40a and the catalyst from the chamber 40b downwardly through the conical cavity 32 whereafter it is discharged from passage 33 and caused to move down the mixing screw 28. During travel down the mixing screw 28, the monomer, aggregate and catalyst are intermixed to initiate a thermo-catalytic reaction during which polymerization takes place. The drill 68 is moved downwardly a distance sufficient to force substantially all of the monomer, aggregate and catalyst through the mixing element means 24 and outwardly through the aligned openings 60 and 64 into the annular space between the lower end of the well casing and the adjacent liquid impermeable bedrock layer 14.

After the monomer, aggregate and catalyst have been intermixed and discharged into the annular space between the lower end of the well casing and the adjacent wall surface of the bore hole 10, some portion of the seal composition mixture remains within the lower chamber 56 of the cartridge means 20. The discharged seal mixture is caused to permeate any void areas within the adjacent surface of the bedrock. Polymerization of the mixed seal composition through its own action and the action of water or other substances used in drilling the bore hole 10 cause a chemical and mechanical bond to be formed between the plastic well casing, sealing composition and adjacent liquid impermeable bedrock layer 14. Complete polymerization and hardening of the seal thus formed may take approximately 120 minutes or less.

After the seal material has polymerized and solidified, the drill 68 may be rotated and moved further axially downwardly to continue drilling through the seal plug formed within the lower end of the well casing 16 to complete drilling of the well hole down to the selected depth sufficient to communicate with the liquid reservoir, such as water, disposed within or below the bedrock layer 14. The seal formed between the well casing 16 and the adjacent liquid impermeable bedrock layer 14 is effective to prevent seepage of fluids from the upper strata 12 downwardly between the well casing and the bedrock into the well hole so as to prevent contamination of the liquid reservoir to which the well is drilled, and also to prevent inward seepage of undesirable fluids into the well casing at its lower end.

Thus, in accordance with the present invention, a method and apparatus for forming a seal between the lower end of a tubular plastic well casing and an adjacent strata layer of liquid impermeable bedrock is provided wherein a length of tubular well casing 16 is inserted into a predrilled bore hole 10 which extends down to and at least partially into the liquid impermeable layer 14 such that the lower end of the well casing is disposed within the portion of the bore hole in the liquid impermeable layer. The well casing 16 has at least one opening 60 formed in its peripheral wall adjacent its lower end. A predetermined quantity of a selected aggregate 48, a predetermined quantity of a resin monomer and a predetermined quantity of a catalyst are retained within cartridge storage means 20 within the lower end of the well casing with a flexible divider wall 46 being operative to maintain the catalyst separated from the mixture of aggregate and resin monomer. The aggregate, resin monomer and catalyst are caused to be mixed by forcing the plunger disc 44 downwardly, such as by the drill 68, to break the frangible seal 38 and force the aggregate, resin monomer and catalyst from the chambers 40a and 40b downwardly along the mixing screw 28 from which the mixture is discharged through the opening 36 in the discharge plate 34. The mixture starts polymerization as it passes along the mixing screw 28 and is ejected through the wall openings 60 and 64 by the spreader 54 so as to form a solid plug seal between the outer periphery of the well casing and the adjacent impermeable layer, the plug seal being chemically and mechanically adhered to the impermeable bedrock layer 14 and the adjacent peripheral surface of the well casing. Thereafter, the well hole is drilled through the plug seal to a liquid reservoir below the lower end of the well casing 22 so that the liquid may be drawn upwardly to surface level through the well casing.

While a preferred embodiment of the method and means for sealing a tubular well casing to a liquid impermeable bedrock layer in accordance with the present invention has been illustrated and described, it will be understood by those skilled in the art that changes and modifications may be made therein without departing from the invention in its broader aspects. Various features of the invention are defined in the following claims.

What is claimed is:

1. A method for sealing a tubular well casing to a liquid impermeable layer such as bedrock when drilling a well so as to prevent contaminants within the strata above the impermeable layer from seeping downwardly between the periphery of the casing and the impermeable layer, said method comprising the steps of:

(a) inserting a length of tubular well casing into a predrilled bore hole which extends down to and at least partially into the liquid impermeable layer such that the lower end of said well casing is disposed within the portion of said hole in said liquid impermeable layer, said casing having at least one discharge opening formed in its peripheral wall adjacent its lower end, (b) introducing a cartridge into said casing to a position adjacent said discharge opening, said cartridge defining a storage chamber containing a predetermined quantity of a selected aggregate, a predetermined quantity of a resin monomer and a predetermined quantity of a catalyst with said aggregate and resin monomer being separated from said catalyst by frangible seal means disposed within said chamber, said chamber being defined on its upper boundary by a plunger axially movable within said cartridge when subjected to an external axial force so as to eject materials from said chamber, said cartridge further having mixing element means disposed axially adjacent said storage chamber such that materials ejected from said storage chamber upon axial movement of said plunger are caused to pass through said mixing element means for intermixing, (c) applying an axial force to said plunger sufficient to effect movement of said plunger in a direction to fracture said frangible seal means and force said aggregate, resin monomer and catalyst to pass downwardly through said mixing element means for intermixing and polymerization thereof, (d) continuing said movement of said plunger sufficiently to cause said mixture to be at least partially ejected through said discharge opening so as to form a solid nonflexible plug seal between the outer periphery of said well casing and said adjacent impermeable layer, said plug seal being chemically and mechanically adhered to said impermeable layer and the peripheral surface of said well casing adjacent said well opening therein, and (e) drilling through said plug to a liquid reservoir below said end of said well casing so that said liquid may be drawn upwardly to surface level through said well casing.

2. The method as defined in claim 1 wherein said well casing is made of a plastic material and said liquid is well water.

3. The method as defined in claim 1 wherein said cartridge means contains sufficient quantities of said aggregate, resin monomer and catalyst to cause said plug seal to be formed about said well casing between said impermeable layer and said well casing and also within the lower end of said well casing.

4. The method of claim 1 wherein said well casing has a diameter less than the diameter of said predrilled bore hole so as to form an annular space between said casing and said liquid impermeable layer, and wherein said ejected mixture forms an annular seal about the periphery of said well casing within said annular space.

5. The method as defined in claim 1 wherein said resin monomer comprises a vinyl monomer taken from the group comprising styrene and divinylbenzene, and wherein said catalyst comprises an organic catalyst.

6. The method as defined in claim 5 wherein said organic catalyst comprises benzoyl peroxide.

7. A method as defined in claim 6 wherein said aggregate is taken from the group consisting of sand and fumed silica.

8. A well casing for insertion into a bore of predetermined diameter drilled into the ground to the depth of a liquid impermeable layer such as bedrock and drilled partially into said impermeable layer, said well casing being tubular and having a lower end having at least one discharge opening through its annular peripheral wall so that said opening is juxtaposed to said impermeable layer when said casing is disposed within said drilled bore, a material supply cartridge supported within said well casing adjacent said lower end thereof, said cartridge defining a material storage chamber containing a predetermined quantity of a selected aggregate, a predetermined quantity of a selected resin monomer and a predetermined quantity of a selected catalyst operative when in contact with said monomer to initiate a thermo-catalytic reaction and effect polymerization of said resin monomer, said cartridge including frangible seal means adapted to normally maintain said aggregate and resin monomer separated from said catalyst, said storage chamber having an upper boundary defined by a plunger axially movable within said cartridge when subjected to an external axial force sufficient to effect fracturing of said frangible seal means and eject said resin monomer, aggregate and catalyst from said storage chamber, said cartridge further including mixing element means disposed axially adjacent said material storage chamber such that material ejected from said storage chamber upon axial movement of said plunger is caused to pass through said mixing element means and is mixed during said passage therethrough whereafter the intermixed material passes to the bottom of said casing and outwardly through said discharge opening to form a solid nonflexible liquid impermeable seal between the lower end of said casing and the impermeable layer, said seal being chemically and mechanically adhered to the impermeable layer and said well casing so as to prevent liquid seepage between said casing and said impermeable layer from strata above said impermeable layer.

9. A well casing as defined in claim 8 wherein said well casing has a plurality of discharge openings in its lower end, said cartridge including a plurality of discharge openings in its lower end adapted for registration with said discharge openings in said well casing.

* * * * *

UNITED STATES PATENT AND TRADEMARK OFFICE
CERTIFICATE OF CORRECTION

PATENT NO. : 4,083,406
DATED : April 11, 1978
INVENTOR(S) : Thomas L. Metz

It is certified that error appears in the above-identified patent and that said Letters Patent are hereby corrected as shown below:

Column 9, line 22, change "6" to --5--.

Signed and Sealed this

Seventeenth Day of October 1978

[SEAL]

Attest:

RUTH C. MASON
*Attesting Officer*

DONALD W. BANNER
*Commissioner of Patents and Trademarks*